United States Patent [19]
Smith

[11] Patent Number: 5,505,278
[45] Date of Patent: Apr. 9, 1996

[54] FOUR-WHEEL DRIVE AND STEERING SYSTEM FOR DROPFRAME VECHICLES

[75] Inventor: Earl D. Smith, Scottsdale, Ariz.

[73] Assignee: DBX Engineering Corp., Indianapolis, Ind.

[21] Appl. No.: 192,139

[22] Filed: Feb. 4, 1994

[51] Int. Cl.$^6$ ................................................ B60K 17/354
[52] U.S. Cl. ........................ 180/246; 180/371; 180/376; 180/24.11
[58] Field of Search .................................. 180/233, 245, 180/246, 248, 337, 371, 376, 24.08, 24.11, 22, 379, 383, 385, 711, 713, 698, 234

[56]  References Cited

U.S. PATENT DOCUMENTS

| 2,024,148 | 12/1935 | Dahl | 180/24.11 X |
|---|---|---|---|
| 2,212,453 | 8/1944 | Perkins | 180/246 X |
| 2,607,431 | 8/1952 | Buckendale | 180/24.11 |
| 4,039,037 | 8/1977 | Vin | 180/371 X |
| 4,934,733 | 6/1990 | Smith et al. | 280/711 |

FOREIGN PATENT DOCUMENTS 0476619  12/1937  United Kingdom ................ 180/24.11

Primary Examiner—Margaret A. Focarino
Assistant Examiner—F. Zeender
Attorney, Agent, or Firm—Woodard, Emhardt, Naughton, Moriarity & McNett

[57]  ABSTRACT

A four wheel drive and steering system for a motor vehicle includes a splitter gear assembly coupled to the transmission for splitting rotational power between the front wheels and one set of wheels of a tandem rear wheel vehicle. A first drive train rotationally couples the front wheels to the transmission, while a second drive train drives the one set of rear wheels. The second drive train includes a pair of shaft assemblies, each corresponding to a respective rear wheel. Each of the pair of shaft assemblies includes a rear shaft extending substantially parallel to the longitudinal axis of the vehicle adjacent a vertical plane including the corresponding rear wheels, thereby providing clearance for the floor of a dropframe cargo compartment. A transfer gear assembly couples the corresponding rear wheel to the rear shaft of the shaft assembly. The steering system is coupled between the steering linkage for the front wheels and the other set of tandem rear wheels. The steering system includes an actuator connected to the front steering linkage that provides a hydraulic signal to a power cylinder between the rear wheels. A rear wheel linkage connects the power cylinder to the rear wheels to turn the rear wheels in proportion to the degree of turn of the front wheels.

13 Claims, 4 Drawing Sheets

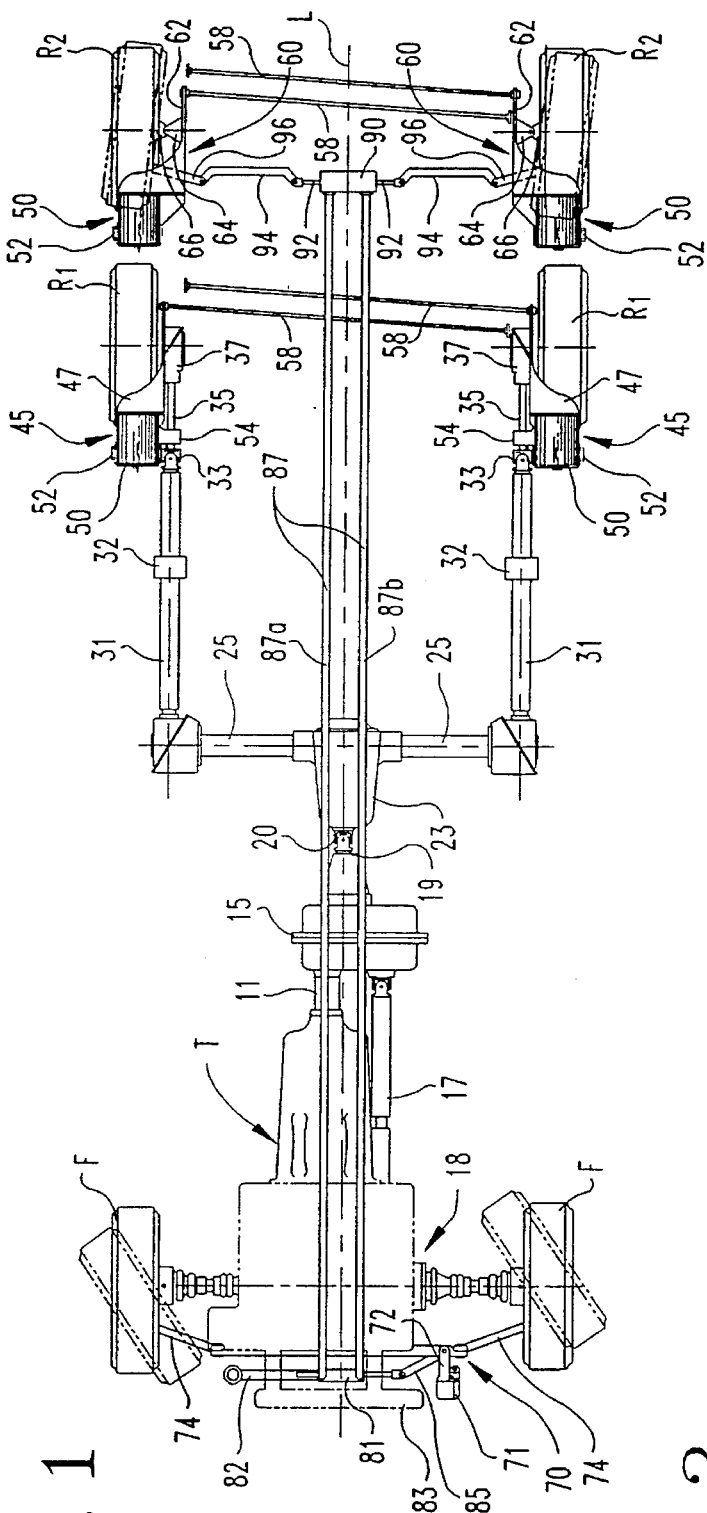
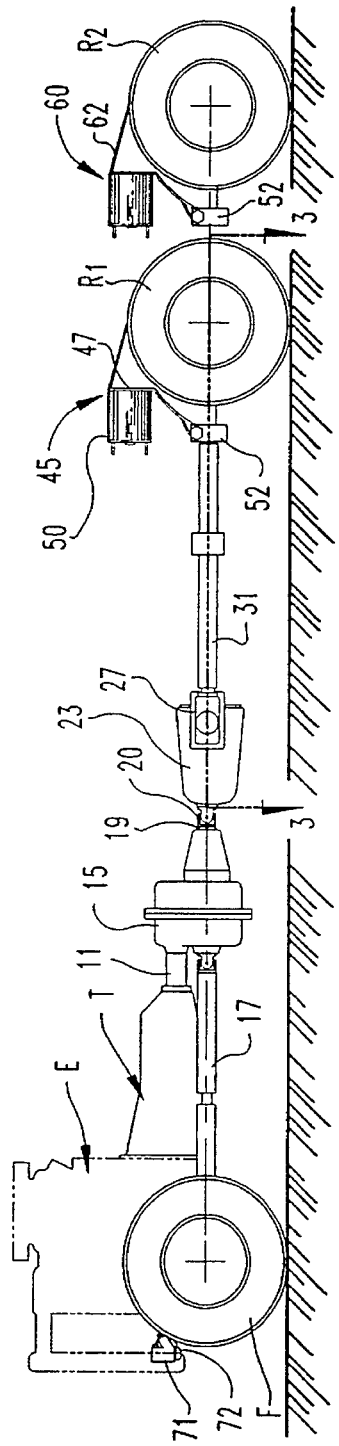
Fig. 1
Fig. 2

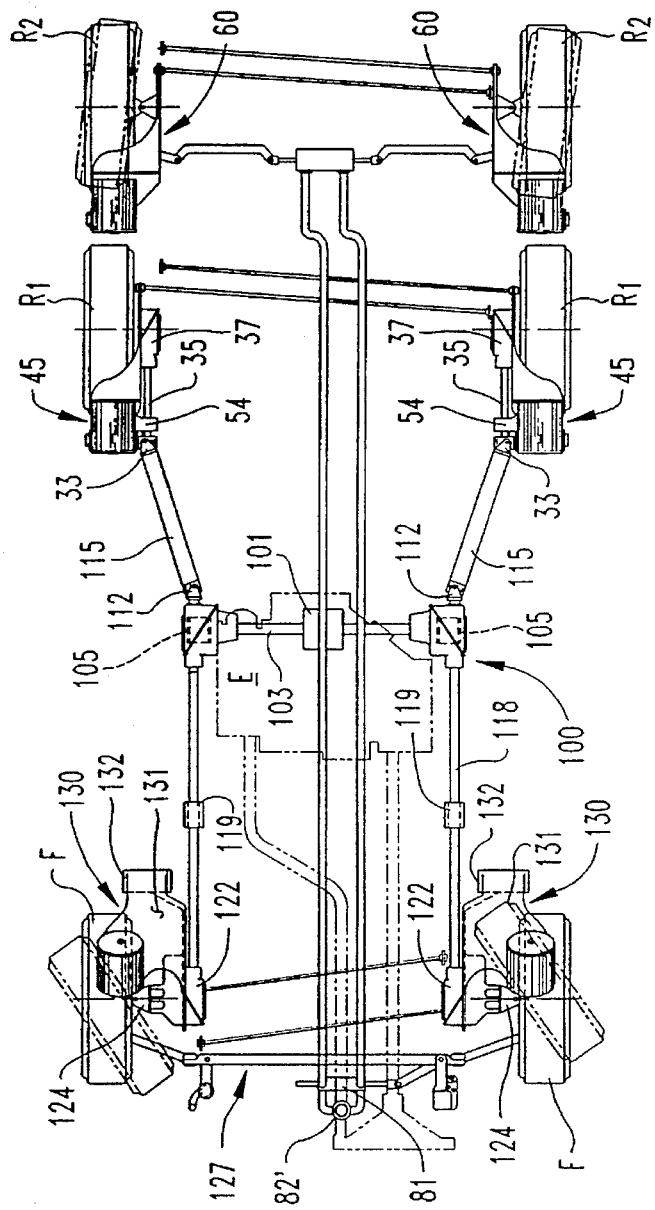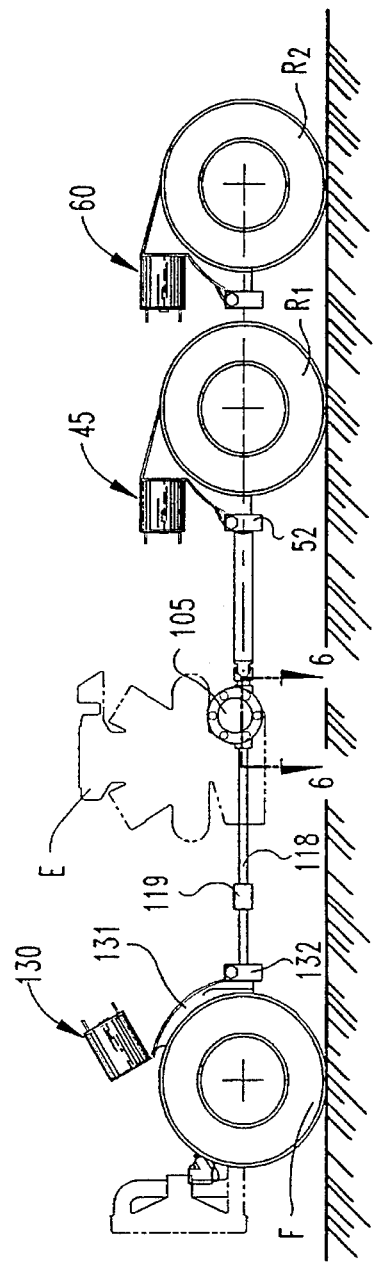
Fig. 4
Fig. 5

FOUR-WHEEL DRIVE AND STEERING SYSTEM FOR DROPFRAME VECHICLES

BACKGROUND OF THE INVENTION

The present invention relates to the field of dropframe vehicles, such as semi-trailers or other vehicles in which a wide and low cargo floor is desired. More particularly, the invention relates to a four-wheel drive system and four-wheel steering system for such vehicles.

Virtually every commodity on the market today is, at one time or another, transported by truck. Often the truck is a tractor-trailer rig or in some cases a delivery van or pick-up. It is axiomatic that the larger the cargo space for a fully loaded van or trailer, the lower the per-mile transportation cost for the transported commodity.

Various governmental regulations dictate the maximum dimensions of highway vehicles. What is required, then, is a vehicle that falls within the regulated dimensions while maximizing the total cargo carrying volume of the vehicle. One approach has been to use a so-called "dropframe" for the cargo-carrying body. In this construction, the floor of the cargo compartment is dropped close to the road surface between the suspension apparatus of the trailer or van.

In our prior patent, U.S. Pat. No. 4,934,733, assigned to DBX Corporation, we disclosed a wheel suspension system which when used with a trailer, for instance, permits the floor of the trailer body to be lowered closer to the roadway surface than with the prior suspensions, and which permits the floor to be substantially flat throughout the length of the cargo compartment. This suspension system has been successfully used in a variety of vehicles, including semi-trailer rigs, delivery vans and pick-ups. One limitation of this trailer suspension system is that it has been limited to use with conventional front-wheel drive and steering vehicles.

There is a need in the transportation and shipping industry for a four-wheel drive system and a four-wheel steering system that can be used with the dropframe type trailer suspension apparatus, such as the apparatus disclosed in the '733 patent. The four-wheel drive and steering system must provide adequate clearance for the floor of the dropframe storage compartment, while maintaining performance characteristics comparable to known four-wheel drive and steering systems.

SUMMARY OF THE INVENTION

In one aspect of the present invention, a four-wheel drive system for a vehicle includes means for splitting rotational power from a transmission between the front wheels of the vehicle and at least two of the plurality of rear wheels. A first drive train rotatably couples the front wheels to the drive splitter. A second drive train also rotatably couples the two rear wheels to the drive splitter in order to provide power to the rear wheels. The second drive train includes opposite pairs of rear shaft assemblies which are connected by way of a transfer gear assembly to drive the rear wheels. Each of the shaft assemblies includes a rear shaft which extends parallel to the longitudinal axis of the vehicle and adjacent to a vertical plane including the corresponding rear wheel, thereby maintaining clearance for the dropframe floor of the cargo compartment of the vehicle.

In one specific embodiment of the four-wheel drive system, a transfer case is attached to the output of the transmission to provide power through a forward drive shaft to the front wheels and through a rear coupling to a rear wheel differential. A pair of transfer shafts are connected by way of a transfer gear assembly between the differential and each of the rear shafts of the rear shaft assembly.

In a second embodiment, a pair of opposing transfer shafts extend from the differential of a transaxle drive arrangement. Each of the transfer shafts are connected to a transfer gear assembly which splits power between a forward drive shaft and a rear drive shaft.

In another aspect of the invention, a four-wheel steering system is provided to steer a pair of a plurality of rear wheels of the vehicle. The rear wheel steering system includes a hydraulic actuator having a control arm connected to the front wheel steering linkage. A rear cylinder includes a rear wheel steering linkage connected from the cylinder to each of the steerable rear wheels. Hydraulic tubing connects the front actuator and the rear power cylinder. Steering of the front wheels causes the control arm to stroke the front actuator corresponding to the amount of turn of the front wheels. This amount of turn is hydraulically translated to stroke the control rod of the rear power cylinder, thereby moving the rear wheel steering linkage and rear wheels a corresponding amount. In one specific embodiment, the degree of turn of the rear wheels is limited to a fixed proportion of the degree of turn of the front wheels.

One object of the present invention is to provide a four-wheel drive system and a four-wheel steering system for use with dropframe vehicles. A further object is to provide such a system for use with vehicles having at least tandem rear wheel pairs. Yet another object is to lessen tire wear on the rear wheels that can be caused by scuffing the rear wheels during a turn.

Further objects and advantages of the present invention will be apparent from the following description and accompanying figures.

BRIEF DESCRIPTION OF THE DRAWINGS

FIG. 1 is a top view of the four-wheel drive and steering system of the present invention as connected to the front and rear wheels of a vehicle, with the vehicle frame eliminated for clarity.

FIG. 2 is a side view of the front-wheel drive and steering system shown in FIG. 1.

FIG. 4 is a top view of a second embodiment of the four-wheel drive and steering system of the present invention with the vehicle frame removed for clarity.

FIG. 5 is a side view of the four-wheel drive and steering system shown in FIG. 4.

DESCRIPTION OF THE PREFERRED EMBODIMENTS

Figure 3:
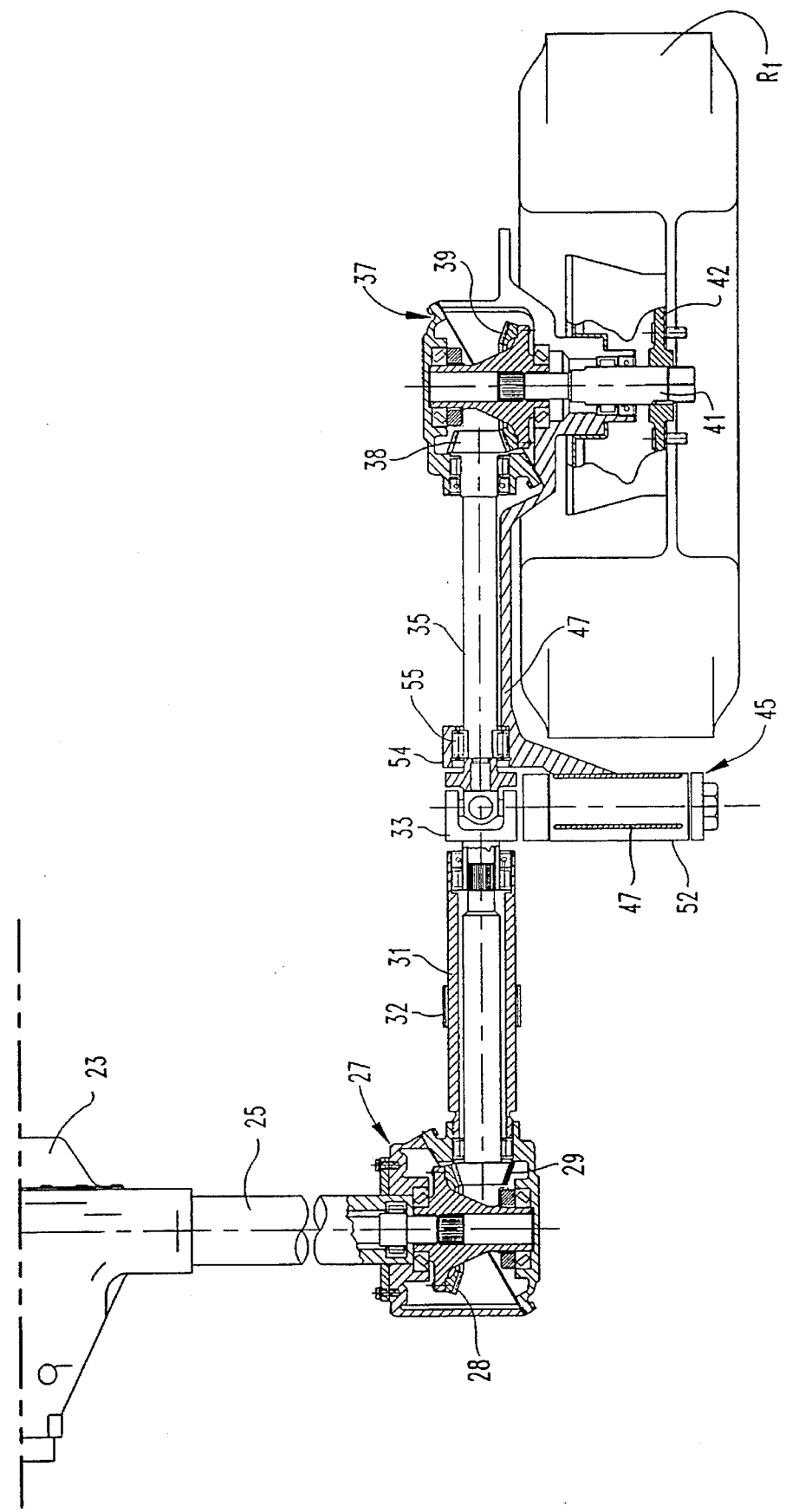
FIG. 3 is a top cross-sectional view of the rear wheel drive shaft assembly shown in FIGS. 1 and 2, taken along line 3—3 in FIG. 2 as viewed in the direction of the arrows.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a drive system 10 of one embodiment of the invention is illustrated for use with a vehicle having a pair of front wheels F and tandem rear wheel pairs $R_1$ and $R_2$. The vehicle includes a standard forward-mounted engine E and transmission T. A main drive shaft 11 provides rotational power from the transmission T to a transfer case 15. The transfer case can be of known construction and includes internal gearing to split the rotational power from the engine and transmission between a forward drive shaft assembly 17 and a rear drive shaft 19. Thus, the transfer case 15 operates as a means for splitting the drive power from the engine between the two shafts 17 and 19. The forward drive shaft assembly 17 is coupled to and provides rotational drive power to a front wheel drive axle assembly 18 which drives each of the front wheels F. The front axle assembly 18 can be of known construction for front-wheel drive arrangements.

The rear drive shaft 19 is rotationally coupled by way of a universal joint 20 to a rear differential 23. The rear differential 23 can be of known construction to provide differential rotational power to a pair of opposite transverse shafts 25. Each of the transverse shafts 25 is coupled to a transfer gear assembly 27 which transfers the rotational drive power at right angles to a corresponding rear transfer shaft assembly 31. The details of the transfer gear assembly are shown in FIG. 3. The transfer gear assembly 27 includes an input hypoid gear 28 and an output pinion gear 29. The output pinion gear 29 is connected to the rotating shaft of the rear transfer shaft assembly 31. The gears 28 and 29 are supported in meshed engagement by bearings mounted in the housing for the transfer gear assembly 27.

Each of the rear transfer shaft assemblies 31 is supported by a shaft support 32 mounted to the vehicle frame (not shown). The rotating shafts of each of the rear transfer shaft assemblies 31 are coupled by way of splined fittings to a corresponding universal joint 33. The universal joint 33 couples the rear transfer shaft assembly 31 to a corresponding rear pinion shaft 35 which provides rotational drive power to the forward pair of rear wheels $R_1$ through a transfer gear assembly 37. The transfer gear assembly 37 is substantially similar to the transfer gear assembly 27 previously described, and includes an input bevel gear 38 connected to the rear pinion shaft 35 and an output bevel gear 39 connected to the drive spindle 41. The drive spindle 41 is fixed to a mounting flange 42 to which the rear wheel $R_1$ is connected, as shown in FIG. 3.

From FIGS. 1–3, it should be readily discerned by one of ordinary skill in the art that rotational power provided from the engine E and transmission T through the main drive shaft 11 is split by way of the transfer case 15 to simultaneously provide power to the front wheels F and the forward pair of rear wheels $R_1$. The front drive shaft assembly 17 and front wheel drive assembly 18 can be of standard construction known in the art. However, the rear wheel drive portion of the system 10 represents a novel deviation from known four-wheel drive systems. The rotational drive power split from the transfer case 15 is provided through the differential 23 to both of the opposite rear wheels $R_1$. The use of the transverse shafts 25 and transfer gear assemblies 27 permit the shafts immediately driving the rear wheels to be offset from the centerline or longitudinal axis L of the vehicle. The length of each of the transfer shafts 25 is determined by the width of the floor of the dropframe cargo compartment. The transfer gear assemblies 27, rear transfer shafts 31 and rear pinion shafts 35 are oriented parallel to the longitudinal axis L of the vehicle and parallel to a plane which includes the forwardmost rear wheels $R_1$ to provide clearance for the dropframe floor.

A suspension assembly 45 is also provided for the vehicle. The construction of each of the suspension assemblies can be substantially similar to the construction described in U.S. Pat. No. 4,934,733, which description is incorporated herein by reference. For the preferred embodiment of the present invention, the suspension assembly 45 includes improvements over the suspension assemblies described in the '733 patent incorporated by reference. (These improvements are the subject of a separate application by the same inventors.) The actual construction of the suspension assemblies 45 may vary from those depicted in the figures or described by incorporation above, provided that the suspension assemblies provide means for individual suspension of each wheel $R_1$ and $R_2$.

For clarity, the construction of each suspension assembly will be briefly described. Each assembly 45 includes a wheel plate 47 which carries bearings supporting the drive spindle 41 for each of the forwardmost rear wheels $R_1$. A portion of each wheel plate 47 is configured to extend upwardly into the wheel well (not shown) of the vehicle and connect to a shock absorber member 50. The shock absorber member 50 is connected to the vehicle wheel well or frame in a manner described in the aforementioned '733 patent. The shock absorber member 50 preferably includes an air bag. The lowermost portion of the wheel plate 47 is pivotably supported by a pivot bushing assembly 52 which assembly is also mounted to the vehicle frame. The pivot bushing assembly preferably includes a rubber bushing in tension which provides pivotal support and torsional resistance to rotation of the wheel plates 47 as the vehicle wheels $R_1$ or $R_2$ move vertically in response to road conditions. As the wheels move and the wheel plates 47 pivot, the shock absorber member 50 controls the wheel motion.

Each wheel plate 47 also include a shaft support 54 which extends from the plate and carries a bearing assembly 55. The rear pinion shaft 35 extends through the bearing assembly 55 and supported by shaft support 54 to insure that the rear pinion shaft 35 moves with the wheel $R_1$. In addition, the transfer gear assembly 37 is mounted to the wheel plate 47 so that it too moves as the wheel $R_1$ moves. The universal joint 33 between the rear transfer shaft assembly 31 and the rear pinion shaft 35 is included to permit this relative motion between the two shafts 35.

A stabilizer rod or tracking rod 58 is connected between a rear portion of the wheel plates 47 and the vehicle frame across the vehicle body. The stabilizer rods 58 cross the vehicle body underneath the frame so as not to interfere with the cargo compartment. The stabilizer rod 58 provides lateral stability to the wheel plates 47.

The rearward wheels $R_2$ include a suspension assembly 60 which is similar to the suspension assemblies 45. In one version, the stub axle of the wheels $R_2$ can be carried by bearings mounted in the wheel plate 62. In this arrangement the rearward wheels $R_2$ are nonsteerable. However, the wheel plate 62 of each assemblies 60 can be modified to accommodate a steering pivot 64. The steering pivot 64 provides pivotable support for the rear wheel $R_2$ to permit turning of the wheel. The stub axle of the rear wheel $R_2$ is connected to knuckle and kingpin assembly 66 that pivotably engages the steering pivot 64.

In a second aspect of the invention, a four-wheel steering system is also provided. The vehicle includes a front steering linkage 70 which s controlled by a steering gear 71. The front steering linkage 70 includes an intermediate steering arm 72 from the steering gear 71 which is connected to a tie rod 73. The ends of the tie rod 73 are connected to each of the front wheels F by way of a front control arm 74. Steering of the front wheels is accomplished in a standard manner and the front steering linkage 70 can be of conventional construction for front-wheel drive vehicles. It is, however, understood that in the absence of front-wheel drive, the front steering linkage 70 can be configured according to known steering assembly designs.

The rear wheel steering assembly 80 includes a hydraulic actuator 81 which is supported by way of a pivot support 82 mounted to the vehicle frame (not shown). An actuator rod 83 extends through the actuator 81 and is connected by way of a control link 85 to one end of the tie rod 73 of the front steering linkage 70. The actuator 81 includes hydraulic fluid under pressure maintained by the actuator. (Alternatively, the fluid may be externally pressurized by way of an accessory driven by the engine E.)

A pair of hydraulic hoses 87a and 87b are connected at opposite ends of the actuator 81 to communicate hydraulic fluid from the actuator to a power member or cylinder 90 situated between the steerable rear wheels $R_2$. A control rod 92 extends through the power cylinder 90 and is connected at each end to an intermediate link 94. Each intermediate link 94 is connected through a corresponding rear control arm 96 to a steering plate (not shown) which forms part of a standard wheel turning mechanism. The rear control arm 96 is connected to the knuckle and kingpin assembly used to turn the wheel while permitting rotation of the wheel about the stub axle. The wheel turning mechanism of the rear wheels $R_2$ can be of known construction provided some means for engagement with the rear control arm 96 and the steering pivot 64 are available.

In the operation of the rear wheel steering assembly 80, operator input to the steering gear 71 (through a steering wheel) accomplishes turning of the front wheels F by way of the front steering linkage 70 in a conventional fashion. As the front wheels F are turned, the tie rod 73 moves essentially transversely back and forth across the vehicle. Motion of the tie rod 73 in one direction causes the control link 85 to move in the same direction, thereby stroking the actuator rod 83 within the actuator body 81. As the actuator rod 83 moves, valving within the actuator 81 directs more or less hydraulic fluid through one of the hydraulic hoses 87a or 87b. Thus, greater or lesser hydraulic pressure passes through either of the hydraulic hoses 87a or 87b to the power cylinder 90. Valving within the power cylinder 90 causes the control rod 92 to move in the opposite direction from the motion of the actuator rod 83 of the front actuator 81. Motion of the control rod 92 is transmitted through the intermediate link 94 and rear control arm 96 to the turning assembly of the rear wheel $R_2$ to pivot the wheel about steering pivot 64.

The actuator 81 and power cylinder 90 are configured so that the front and rear wheels turn in opposite directions, thereby enhancing the rate of turn of the vehicle. Moreover, the rear wheel steering assembly 80 provides for different degrees of turn between the front wheels F and the steerable rear wheels $R_2$. Thus, in the preferred embodiment, the front wheels F are permitted to turn through 30 degrees, while the rear wheels $R_2$ are permitted to turn only through a range of 9 degrees in any one direction. The limitations on the degree of turn of the rear wheels $R_2$ are added in one aspect as a safety feature to prevent the rear of the vehicle from swinging too wide on a turn. In another aspect, the limited degree of turn of the rear wheels $R_2$ better accommodates the nonsteerable pair of rear wheels $R_1$. It is of course understood that the rear wheel steering assembly 80 can be used whether or not the vehicle includes a tandem rear wheel set and whether or not the forwardmost pair of rear wheels $R_1$ are driven.

Figure 6:
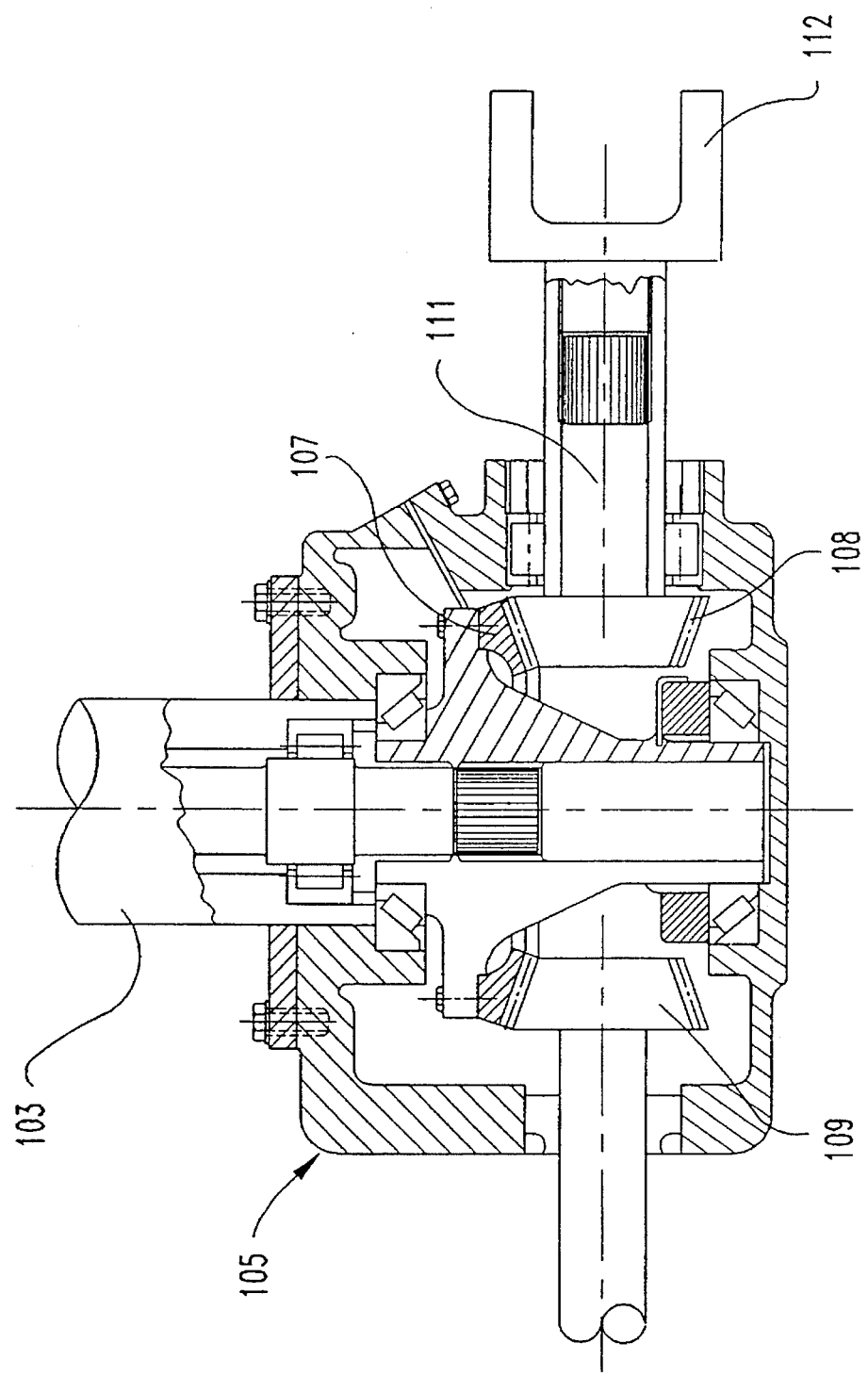
FIG. 6 is a top cross-sectional view of the transfer gear assembly shown in FIGS. 4 and 5, taken along line 6—6 in FIG. 5 as viewed in the direction of the arrows.

An alternative embodiment of the four-wheel drive and four-wheel steering system of the present invention is shown in FIGS. 4–6. In particular, the drive system 100 is intended for use with an engine E having a transaxle and differential assembly 101 of conventional known construction. In this embodiment, the engine E is located mid-ship of the vehicle. A pair of transverse shafts 103 direct power outwardly from the transaxle and differential assembly 101 to opposite sides of the vehicle. The transverse shafts 103 provide input to a pair of opposite splitter gear assemblies 105 which operate as a means for splitting rotational power from the engine between the front and rear wheels. The details of these assemblies are shown in FIG. 6. The transverse shaft 103 is connected to an input bevel gear 107. The splitter gear assembly 105 includes a pair of output bevel gears 108 and 109. The forwardmost output bevel gear 109 provides power to the front wheels F, while the rear output bevel gear 108 provides power to the rear driven wheels. The rear output bevel gear 108 is connected by way of a short shaft to a U-joint 112 which couples the splitter gear assembly 105 to a rear transfer shaft 115. In the preferred embodiment the rear transfer shaft 115 is angled slightly outward toward the rear wheels $R_1$.

The forward output bevel gear 109 is connected to a forward shaft 118 which extends to the front wheels F. A shaft support 119 is mounted to the vehicle frame (not shown) to support the forward shaft 118. Each of the front wheels includes a transfer gear assembly 122 which is substantially similar to the transfer gear assembly 37 of the previous embodiment. The transfer gear assembly 122 transmits the rotation of the forward shaft 118 at right angles to the rotating steering pivot 124 of each wheel. Each transverse gear assembly 122 may be connected to and provide rotational drive power to a standard steerable front-wheel drive arrangement known in the art.

As generally illustrated in FIGS. 4 and 5, a front steering linkage 127 is provided to steer the front wheels F. Each front wheel includes its own suspension assembly 130 having a wheel plate 131 pivotably mounted to the vehicle frame through a pivot bushing assembly 132. The suspension assembly 130 is substantially similar to the suspension assembly 60 of the previous embodiment in that is permits pivoting or turning of the associated wheel while providing individual suspension for the wheel.

With respect to the rear wheel drive, each rear transfer shaft 115 is connected to a U-joint 33 and gear pinion shaft 35 in the same manner as the previous embodiment as particularly shown in FIG. 3. The rear wheel transfer gear assemblies 37, suspension assemblies 45 and shaft support 54 are substantially as previously described and function to provide power to the rear wheels $R_1$.

In this embodiment, a rear wheel steering assembly 80 is included which is substantially similar to the steering assembly previously described. The only significant difference is the manner in which the forward actuator 81 is supported. An actuator pivot support 82' is depicted which is connected to the vehicle frame (not shown) and provides pivoting support for the actuator 81. The rear wheel steering assembly 80 is identical in all other respects to the system described with respect to th previous embodiment.

The drive system 100 of the embodiment of FIGS. 4–6 provides power to both the front wheels F and the drivable rear wheels $R_1$. The rotational drive power to the rear wheels $R_1$ is accomplished while leaving the cargo compartment area unencumbered by the transverse axle of prior known four-wheel drive systems. The embodiment of the drive system 100 is well suited for four-wheel drive cargo vans or pick-up trucks, particularly those utilizing tandem rear wheel assemblies. In the drive system 100 of this embodiment, all of the wheels on one side of the vehicle are differentially driven with respect to all of the wheels on the other side of the vehicle, by way of the common transaxle and differential 100. That is, power transferred through each of the opposite transverse shafts 103 can be varied depending on whether wheels on one side or the other of the vehicle are slipping or overdriving. In this respect, the drive system 100 of the present embodiment differs from the drive system 10 of the prior embodiment in which the front wheels included their own differential and the rear wheels also included a separate differential 23. Another difference is that the embodiment of the drive system 100 is well suited for mid-engine vehicles, while the drive system 10 is best suited for forward-mounted engines as shown in FIG. 1. Which of the two embodiments of the drive systems 10 or 100 is used depends upon the particular application of the vehicle and the particular power capabilities of the engine E.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For instance, it is understood that different permutations and combinations of each of the drive systems and steering systems may be implemented. For instance, as shown in FIGS. 1 and 4, a vehicle may include a four-wheel drive system, such as system 10 or 100, in combination with front wheel steering and rear wheel steering system, such as steering linkage 70 and steering assembly 80.

The vehicle may also simply include one of the four-wheel drive systems 10 or 100. Or the vehicle may have a front-wheel drive system and the four-wheel steering of the present invention provided by the front steering linkage 70 and rear wheel steering assembly 80. In another variation, the vehicle can be a rear-wheel drive four-wheel steering vehicle. In each instance, the maximum benefit of the invention is attained by having separate individual wheel suspension assemblies, such as suspension assemblies 45, 60 and 130 illustrated in the figures. With respect to the rear wheels $R_1$ and $R_2$, the individual suspension assemblies 45 or 60 permit the use of a dropframe cargo compartment. With respect to the front wheels as shown in FIG. 4, the front-wheel suspension assembly 130 best accommodates the features of the drive system 100 including the separate forward shafts 118 and transfer gear assemblies 122, while permitting steering of the front wheels.

What is claimed is:

1. A four wheel drive system for a motor vehicle having a frame with a longitudinal axis, an engine, a transmission operatively coupled to the engine, a pair of ground engaging steerable front wheels and a pair of ground engaging rear wheels having a first rear wheel and a second rear wheel, the system comprising:

means for splitting rotational power from the transmission between the front wheels and the rear wheels;

a first drive train rotationally coupled between said means for splitting and the front wheels for driving the front wheels; and a second drive train rotationally coupled between said means for splitting and the rear wheels for driving the rear wheels, and including:

a first shaft assembly rotationally connected to said means for splitting and including a first rear shaft extending substantially parallel to the longitudinal axis of the vehicle adjacent a first vertical plane including said first rear wheel;

a second shaft assembly rotationally connected to said means for splitting and including a second rear shaft extending substantially parallel to the longitudinal axis of the vehicle adjacent a second vertical plane including said second rear wheel;

a first transfer gear assembly connected between said first rear wheel and said first rear shaft; and a second transfer gear assembly connected between said second rear wheel and said second rear shaft.

2. The four wheel drive system for a motor vehicle of claim 1 further comprising:

a wheel suspension system for mounting said first rear wheel and said second rear wheel to the vehicle, including means for permitting independent resistive movement of the rear wheels relative to the vehicle; and means for rotationally supporting said first rear shaft and said second rear shaft, said means for rotationally supporting being attached to said means for permitting independent resistive movement of said wheel suspension system.

3. The four wheel drive system for a motor vehicle of claim 2, wherein said means for permitting independent resistive movement of the rear wheels is substantially disposed adjacent said first vertical plane and said second vertical plane.

4. The four wheel drive system for a motor vehicle of claim 2, wherein said first shaft assembly includes a first transfer shaft forward of said first rear shaft and a first universal joint connecting said first transfer shaft and said first rear shaft; and wherein said second shaft assembly includes a second transfer shaft forward of said second rear shaft and a second universal joint connecting said second transfer shaft and said second rear shaft.

5. The four wheel drive system for a motor vehicle of claim 2, wherein said second drive train includes a first universal joint and a second universal joint, said first universal joint connected between said first rear wheel and said means for splitting; and said second universal joint connected between said second rear wheel and said means for splitting.

6. The four wheel drive system for a motor vehicle of claim 1, wherein said means for splitting includes:

a first output shaft included in said first drive train;

a second output shaft included in said second drive train; and gear means for rotationally connecting said first and second output shafts to the output of the transmission for providing rotational power to said first and second output shafts; and said second drive train includes means for rotationally coupling said second output shaft to said first shaft assembly and to said second shaft assembly.

7. The four wheel drive system for a motor vehicle of claim 6, wherein said means for rotationally coupling said second output shaft to said first shaft assembly and to said second shaft assembly includes:

a differential connected to said second output shaft;

a first transverse shaft connected to said differential and extending transverse to the longitudinal axis of the vehicle;

a second transverse shaft connected to said differential and extending transverse to the longitudinal axis of the vehicle;

means for coupling said first shaft assembly to the first transverse shaft and for coupling said second shaft assembly to the second transverse shaft.

8. The four wheel drive system for a motor vehicle of claim 1, wherein:

said means for splitting includes:

a pair of transverse shafts coupled to an output of the transmission and extending transverse to the longitudinal axis of the vehicle;

a pair of transfer cases, each connected to a respective one of said pair of transverse shafts, each of said pair of transfer cases having two outputs;

said first drive train includes:

a pair of forward shafts, each respectively coupled to one of said two outputs of each of said pair of transfer cases; and means for rotationally connecting each of said pair of forward shafts to a corresponding one of the front wheels; and wherein said first and second shaft assemblies are respectively rotationally connected to the other of said two outputs of each of said pair of transfer cases.

9. The four wheel drive system for a motor vehicle of claim 8, wherein each of said first and second shaft assemblies includes a transfer shaft rotationally coupled between a respective one of said pair of transfer cases and said first and second rear shafts respectively.

10. The four wheel drive system for a motor vehicle of claim 8, further comprising means for steering the front wheels of the vehicle while the wheels are driven by said first drive train.

11. A drive system for a motor vehicle having an engine, a transmission operatively coupled to the engine, a pair of ground engaging steerable front wheels and a pair of ground engaging rear wheels having a first rear wheel and a second rear wheel, the system comprising:

means for splitting rotational power from the transmission between the front wheels and the rear wheels;

a first shaft assembly including;

a first transverse shaft connected to the transmission and extending transverse to the longitudinal axis of the vehicle;

a first rear shaft extending parallel to the longitudinal axis of the vehicle adjacent a first vertical plane including said first rear wheel;

a first transfer gear assembly connected between said first transverse shaft and said first rear shaft;

a second transverse shaft connected to the transmission and extending transverse to the longitudinal axis of the vehicle;

a second rear shaft extending parallel to the longitudinal axis of the vehicle adjacent a second vertical plane including said second rear wheel;

a second transfer gear assembly connected between said second transverse shaft and said second rear shaft;

a third transfer gear assembly connected between said first rear wheel and said first rear shaft to provide drive power to said first rear wheel; and a fourth transfer gear assembly connected between said second rear wheel and said second rear shaft to provide drive power to said second rear wheel.

12. The four wheel drive system for a motor vehicle of claim 11, further comprising:

a wheel suspension system for mounting said first rear wheel and second rear wheel to the vehicle, including means for permitting independent resistive movement of the rear wheels relative to the vehicle; and means for rotationally supporting said first rear shaft and said second rear shaft, said means for rotationally supporting being attached to said means for permitting independent resistive movement of said wheel suspension system.

13. The four wheel drive system for a motor vehicle of claim 12, wherein said means for permitting independent resistive movement of the rear wheels is substantially disposed adjacent said first vertical plane and said second vertical plane.

* * * * *